US012591204B2

(12) United States Patent
Hinaux et al.

(10) Patent No.: US 12,591,204 B2
(45) Date of Patent: Mar. 31, 2026

(54) HOROLOGICAL MOVEMENT COMPRISING A STRIKING MECHANISM PROVIDED WITH A FLEXIBLE GUIDE

(71) Applicant: The Swatch Group Research and Development Ltd, Marin (CH)

(72) Inventors: Baptiste Hinaux, Lausanne (CH); Jérôme Favre, Neuchatel (CH); Jonathan Meyer, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 422 days.

(21) Appl. No.: 18/310,122

(22) Filed: May 1, 2023

(65) Prior Publication Data

US 2024/0027968 A1 Jan. 25, 2024

(30) Foreign Application Priority Data

Jul. 20, 2022 (EP) ..................................... 22185894

(51) Int. Cl.
| | |
|---|---|
| *G04B 21/06* | (2006.01) |
| *B23K 26/0622* | (2014.01) |
| *B23K 103/00* | (2006.01) |

(52) U.S. Cl.
CPC .......... *G04B 21/06* (2013.01); *B23K 26/0624* (2015.10); *B23K 2103/50* (2018.08)

(58) Field of Classification Search
CPC ...................................................... G04B 21/06
See application file for complete search history.

(56) References Cited

U.S. PATENT DOCUMENTS

| | | | | |
|---|---|---|---|---|
| 2011/0051568 | A1* | 3/2011 | Karapatis | ............... G04B 21/06 |
| | | | | 368/273 |
| 2012/0155227 | A1 | 6/2012 | Karapatis et al. | |
| 2014/0292432 | A1 | 10/2014 | Yamada | |
| 2016/0320753 | A1* | 11/2016 | Bossart | ............... G04B 17/066 |
| 2019/0025761 | A1* | 1/2019 | Chabloz | ................ G04B 13/00 |
| 2019/0286059 | A1* | 9/2019 | Jung | ...................... G04B 21/06 |
| 2022/0137561 | A1 | 5/2022 | Kahrobaiyan | |
| 2022/0197218 | A1* | 6/2022 | Kahrobaiyan | ....... G04B 17/045 |
| 2023/0136065 | A1* | 5/2023 | Bucaille | ............... G04B 17/227 |
| | | | | 368/175 |

FOREIGN PATENT DOCUMENTS

| | | | |
|---|---|---|---|
| CH | 715 617 | A2 | 6/2020 |
| EP | 2 463 731 | A1 | 6/2012 |
| EP | 3 992 730 | A1 | 5/2022 |

OTHER PUBLICATIONS

European Search Report issued Oct. 26, 2022 in European Application 22185894.7 filed on Jul. 20, 2022 3 pages (with English Translation of Categories of Cited Documents).

* cited by examiner

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A horological movement includes a striking mechanism of a watch including a vibrating element and a device for striking the vibrating element including a hammer fastened cantilevered to a structure of the horological movement through blades of a flexible guide. The blades are arranged so as to extend according to directions parallel to an axis T tangent to the vibrating element.

9 Claims, 1 Drawing Sheet

HOROLOGICAL MOVEMENT COMPRISING A STRIKING MECHANISM PROVIDED WITH A FLEXIBLE GUIDE

CROSS-REFERENCE TO RELATED APPLICATION

The present application claims priority to European Patent Application No. 22185894.7, filed on Jul. 20, 2022, the entire content and disclosure of which are incorporated by reference herein.

TECHNICAL FIELD OF THE INVENTION

The invention relates to the field of horological movement complications, and in particular striking mechanisms of a watch.

More particularly, the invention relates to a horological movement comprising a striking mechanism provided with a flexible guide.

Such a striking mechanism may be adapted to any ringing type, such as a repetition of quarters, minutes, a large ring, a small ring or an alarm.

TECHNOLOGICAL BACKGROUND

Striking mechanisms of watches are known to include a hammer intended to hit a vibrating element, such as a timbre.

In particular, the hammer is constrained to move towards the vibrating element by a spring and is cocked, i.e. held away from the timbre, by an activation mechanism, such as a lift or another dedicated mechanism.

In general, the vibrating element extends according to a curvilinear direction in the watch box, for example around a central axis of said box. Upon impact of the hammer on the vibrating element, the hammer generates forces on the vibrating element causing vibration thereof and consequently, the sound of the ring. These forces include a normal component and a tangential component, the latter characterising the frictions of the hammer on the vibrating element.

In particular, setting the vibrating element in vibration is essentially generated by the normal component of the forces applied by the hammer, thereby the need for controlling and maximising this normal component to control the effectiveness of the impact of the hammer on the vibrating element and the sound produced by this impact.

SUMMARY OF THE INVENTION

The invention solves the aforementioned drawbacks by providing, to this end, a horological movement comprising a striking mechanism of a watch comprising a vibrating element and a device for striking said vibrating element. The striking device comprises a hammer fastened cantilevered to a structure of the horological movement through at least two elastic blades forming a flexible guide. The two blades are arranged so as to extend according to directions parallel to an axis T tangent to the vibrating element, in particular at a striking point of the vibrating element intended to be hit by the hammer of the striking device.

In particular embodiments, the invention may further include one or more of the following features, considered separately or according to any technically-feasible combination.

In particular embodiments, the striking device is fastened to the structure of the horological movement only by an embedded type mechanical connection.

In particular embodiments, at least the blades are made of silicon, by deep reactive-ion etching.

In particular embodiments, at least the blades are made by laser machining, in particular by femtosecond laser, or by electrical discharge machining.

In particular embodiments, the striking device is made in one-piece.

In particular embodiments, the striking device is made of amorphous metal, by moulding or by hot forming.

In particular embodiments, the striking device is made of nickel or of nickel-phosphorus, by the LIGA process.

In particular embodiments, the blades have a smaller thickness than that of the hammer.

BRIEF DESCRIPTION OF THE FIGURES

Other features and advantages of the invention will appear upon reading the following detailed description given as a non-limiting example, with reference to the appended drawings wherein.

It should be noted that the figures are not necessarily drawn to scale for clarity purposes.

DETAILED DESCRIPTION OF THE INVENTION

Figure 1:
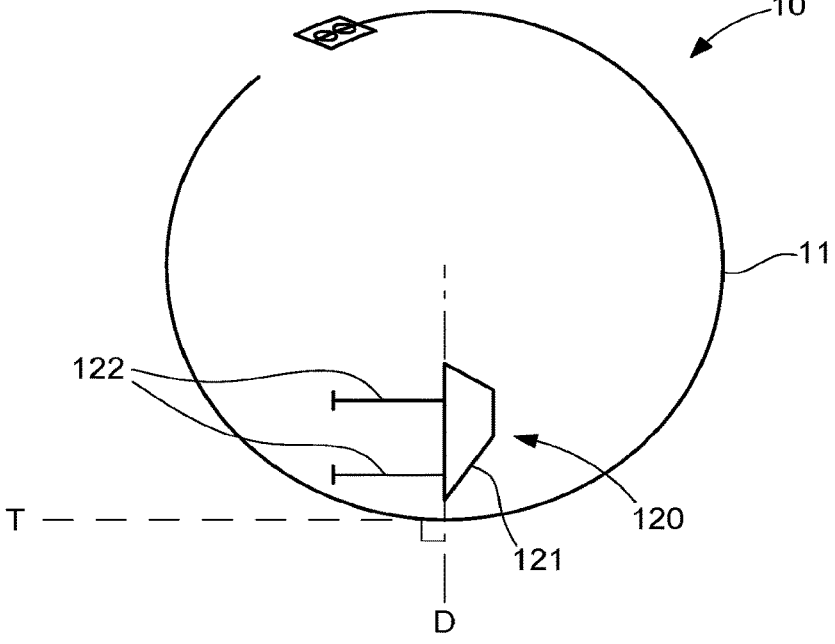
FIG. 1 schematically represents a top view of a striking mechanism comprising a striking device in a rest state, according to a preferred embodiment of the invention.

FIG. 1 shows a striking mechanism 10 of a horological movement of a watch in a preferred embodiment of the invention.

The striking mechanism 10 comprises a vibrating element 11 and a striking device 120 intended to hit said vibrating element 11 in order to cause the production of a sound. The vibrating element 11 is fastened to a structure of the horological movement, for example to a bridge, to a disc, etc., and is, in the embodiment represented in FIG. 1, formed by a timbre.

The striking device 120 comprises a hammer 121 fastened cantilevered to the structure of the horological movement through several blades 122 forming a flexible guide. The blades 122 have an elastic deformation capacity and are used in the present invention for guiding and driving the hammer 121. Preferably, the blades 122 are two in number. In particular, each blade 122 has a rectilinear shape when the striking device 120 is in a rest state, i.e. in a position of equilibrium. The flexible guide formed by the blades 122 is a translational guide.

To sum up, in a manner known per se by a person skilled in the art, the striking device 120 is cocked by an activation mechanism (not represented in the figures), such as a lift or any other dedicated mechanism, i.e. the hammer 121 is driven away from the vibrating element 11, so as to constrain the blades 122 to be deformed progressively, until reaching a cocked state. Next, in response to the passage of a predefined time value of the current hour or upon instruction of the user, the activation mechanism releases the hammer 121 which is then driven, by the effect of the elastic biasing force of the blades 122, to hit on the vibrating element 11, the striking device 120 then being in a striking state.

Advantageously, the blades 122 allow positioning the hammer 121 very accurately with respect to the structure of the horological movement, and in particular with respect to the vibrating element 11, without any backlash and without lubrication, in contrast with a conventional timepiece pivot. Moreover, the blades 122 provide a constant amount of energy to move the hammer 121 in translation, upon each hit of the striking device 120 on the vibrating element 11.

Figure 2:
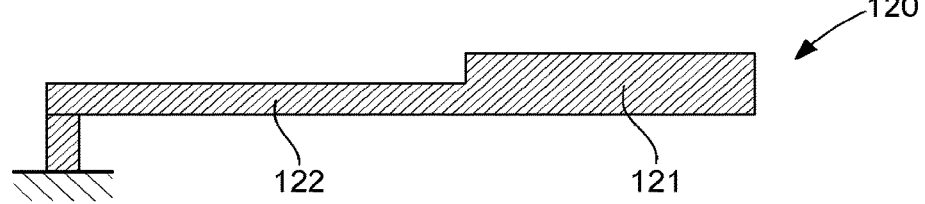
FIG. 2 schematically represents a cross-sectional view of the striking device of the striking mechanism of FIG. 1.

As schematically shown in FIGS. 1 and 2, the blades 122 extend between two longitudinal ends. Hence, each blade 122 is mechanically connected, by one of its longitudinal ends, to the structure of the horological movement, and by its other longitudinal end, to the hammer 121. In other words, the striking device 120 is fastened to the structure of the horological movement only by an embedded type mechanical connection, i.e. the blades 122 form the only mechanical connection between the hammer 121 and the structure.

In particular, each blade 122 may be fastened to the structure of the horological movement by welding, screwing, gluing, tight fitting, or by any other suitable means within the reach of a person skilled in the art.

The blades 122 are arranged so as to extend according to directions parallel to an axis T tangent to the vibrating element 11, as shown in FIG. 1. More specifically, the axis T is tangent to the vibrating element 11 at a point intended to be subjected to the impact of the hammer 121, i.e. at the striking point of the hammer 121. Thus, the hammer is driven in translation according to a direction D perpendicular to the axis T, or substantially in translation according to a direction tangent to a direction D perpendicular to the axis T.

This feature has many advantages.

Indeed, this feature allows maximising the normal component of the forces applied by the hammer 121 on the vibrating element 11 upon hitting, and possibly suppressing any tangential component. Thus, the hit is more effective in terms of forces transmitted to the vibrating element 11 for given elastic characteristics of the blades 122, which generates a higher loudness produced by said hit.

Moreover, this feature allows for a better control of the position of the striking point of the hammer 121 on the surface of the vibrating element 11, and thus allows for a better control of the vibratory reaction of said vibrating element 11 and therefore of the sound effect produced upon hitting. More specifically, the sound effect produced upon hitting is different depending on whether the striking point is located on a vibration antinode or on a vibration node of a vibratory mode of the vibrating element 11.

Finally, the use of a flexible guide and its particular arrangement allows reducing the bulk of the striking device 120 and considerably reducing the number of parts forming said device, to the extent that said flexible guide fills both a guidance function and an elastic biasing function.

Preferably, the striking device 120 is made in one-piece. Thus, the striking device 120 is particularly simple to make, and its manufacturing cost is limited. Furthermore, the mechanism is not likely to suffer from a decrease in power upon hitting related to possible mechanical backlashes that would have existed if the striking device 120 were designed by assembling various parts.

In particular, the striking device 120 may be made of amorphous metal, for example by moulding or hot forming, or of nickel or of nickel-phosphorus, for example by the LIGA process.

Alternatively, the striking device 120, and in particular the blades 122, may be made of silicon, for example by dry etching, and more particularly by deep reactive-ion etching, a manufacturing method known as such to a person skilled in the art by the acronym DRIE standing for Deep Reactive Ion Etching. Alternatively, the blades 122 may be made of steel, by laser machining, in particular by femtosecond laser, or by electrical discharge machining.

In particular, the hammer 121 may include one or more mass(es) made of a metal material, for example of tungsten or of steel, to which the blades 122 are fastened by driving, gluing, by screws or stud-bolts.

Advantageously, the blades 122 have a smaller thickness than that of the hammer 121, as shown in the schematic sectional view of FIG. 2. This feature allows increasing the mass of the hammer 121 compared to that of the blades 122, and therefore increasing the energy supplied by the latter when hitting against the vibrating element 11.

It should be noted that the thickness is defined as being the dimension extending according to a direction perpendicular to a plane in which the striking device 120 and the vibrating element 11 are movable.

More generally, it should be noted that the implementations and embodiments considered hereinabove have been described as non-limiting examples, and that other variants could consequently be considered.

In particular, the hammer has a trapezoidal shape in the embodiment represented in FIG. 1, but it may also have any shape suitable for carrying out the strike.

Furthermore, in the embodiment represented in FIG. 1, the vibrating element 11 is formed by a timbre comprising a strand extending according to a circular direction inside which the striking device 120 is arranged. Alternatively, the striking device 120 could be arranged outside the strand of the timbre.

Moreover, the vibrating element 11 may adopt any suitable shape enabling it to vibrate following a hit of a hammer and gee rate a sound when vibrating, like a bell or a gong.

The invention claimed is:

1. A horological movement comprising:
   a striking mechanism of a watch comprising a vibrating element and a device to strike said vibrating element comprising a hammer fastened cantilevered to a structure of the horological movement through elastic blades forming a flexible guide, wherein said blades are arranged so as to extend according to directions parallel to an axis T tangent to a surface of the vibrating element at a striking point of the hammer such that the hammer is driven in translation in a direction perpendicular to the axis T.

2. The horological movement according to claim 1, wherein the striking device is fastened to the structure of the horological movement only by an embedded mechanical connection.

3. The horological movement according to claim 1, wherein at least the blades are made of silicon, by deep reactive-ion etching.

4. The horological movement according to claim 1, wherein at least the blades are made by laser machining or by electrical discharge machining.

5. The horological movement according to claim 1, wherein at least the blades are made by laser machining by femtosecond laser.

6. The horological movement according to claim 1, wherein the striking device is made in one-piece.

7. The horological movement according to claim 6, wherein the striking device is made of amorphous metal, by moulding or by hot forming.

8. The horological movement according to claim 6, wherein the striking device is made of nickel or of nickel-phosphorus, by the LIGA process.

9. The horological movement according to claim 1, wherein the blades have a smaller thickness than s of the hammer.

* * * * *